US00RE37076E

(19) United States
(12) Reissued Patent
Barker

(10) Patent Number: US RE37,076 E
(45) Date of Reissued Patent: Feb. 27, 2001

(54) LITHIUM ION ELECTROCHEMICAL CELL

(75) Inventor: Jeremy Barker, Redmond, WA (US)

(73) Assignee: Valence Technology, Inc., Henderson, NE (US)

(21) Appl. No.: 09/227,342

(22) Filed: Jan. 8, 1999

Related U.S. Patent Documents

Reissue of:
(64) Patent No.: 5,660,948
Issued: Aug. 26, 1997
Appl. No.: 08/533,882
Filed: Sep. 26, 1995

(51) Int. Cl.[7] ..... H01M 4/62; H01M 10/40
(52) U.S. Cl. ..... 429/324; 429/217; 429/218.1; 429/224; 429/231.1; 429/231.5; 429/344
(58) Field of Search ..... 429/217, 218.1, 429/324, 344, 231.1, 231.5, 224

(56) References Cited

U.S. PATENT DOCUMENTS 4,668,595 * 5/1987 Yoshino et al. ..... 429/194
5,028,500 * 7/1991 Fong et al. ..... 429/194
5,310,553 * 5/1994 Simon et al. ..... 429/194 X
5,312,611 * 5/1994 Takami et al. .
5,352,548 * 10/1994 Fujimoto et al. ..... 429/197

FOREIGN PATENT DOCUMENTS

0627776 A2 * 12/1994 (EP) .
627776 * 12/1994 (EP) .
0634805 A1 * 1/1995 (EP) .
634805 * 1/1995 (EP) .
0652602 A2 * 5/1995 (EP) .
652062 * 5/1995 (EP) .
0713258 A1 * 5/1996 (EP) .
713258 * 5/1996 (EP) .
6-052860 * 5/1994 (JP) .
6-295725 * 10/1994 (JP) .

OTHER PUBLICATIONS

Product Brochure "Graphite for Batteries" Lonza G&T, Ltd., (Sins, Switzerland), unknown.*
Technical Documentation for "Graphite KS 6" Lonza G&T, Ltd. (Sins, Switzerland), Apr. 1993.*
Technical Documentation for "Graphite SFG 44" Lonza G&T, Ltd. (Sins, Switzerland), Apr. 1993.*
Technical Documentation for "Graphite SFG 15" Lonza G&T, Ltd. (Sins, Switzerland), Apr. 1993.*
Technical Documentation for "Graphite KS 15" Lonza G&T, Ltd. (Sins, Switzerland), Apr. 1993.*
Technical Documentation for "Graphite KS 44" Lonza G&T, Ltd. (Sins, Switzerland), Apr. 1993.*

* cited by examiner

*Primary Examiner*—Stephen Kalafut
(74) *Attorney, Agent, or Firm*—Linda M. Deschere

(57) ABSTRACT

Non-aqueous electrochemical cells with improved performance can be fabricated by employing anodes comprising a composition having graphite particles that have a BET method specific surface area of about 6 to about 12 $m^2/g$ and a crystallite height $L_c$ of about 100 nm to about 120 nm, and wherein at least 90% (wt) of the graphite particles are less than 16 $\mu$m in size; a cathode; and a non-aqueous electrolyte containing a solvent and salt that is interposed between the anode and cathode. When employed in an electrochemical cell, the anode can attain a specific electrode capacity of at least 300 mAhr/g. The electrochemical cell has a cycle life of greater than 1500 cycles, and has a first cycle capacity loss of only about 10% to about 15%.

18 Claims, 5 Drawing Sheets

LITHIUM ION ELECTROCHEMICAL CELL

Matter enclosed in heavy brackets [ ] appears in the original patent but forms no part of this reissue specification; matter printed in italics indicates the additions made by reissue.

FIELD OF THE INVENTION

The present invention relates to electrochemical devices and, more particularly, to non-aqueous electrochemical cells demonstrating improved performance.

BACKGROUND OF THE INVENTION

Non-aqueous lithium electrochemical cells typically include an anode of metallic lithium, a lithium electrolyte prepared from a lithium salt dissolved in one or more organic solvents and a cathode of an electrochemically active material, typically a chalcogenide of a transition metal. During discharge, lithium ions from the anode pass through the liquid electrolyte to the electrochemically active material of the cathode where the ions are taken up with the simultaneous release of electrical energy. During charging, the flow of ions is reversed so that lithium ions pass from the electrochemically active material through the electrolyte and are plated back onto the lithium anode.

Recently, the lithium metal anode has been replaced with a carbon anode such as coke or graphite intercalated with lithium metal to form $Li_xC$. In operation of the cell, lithium passes from the carbon through the electrolyte to the cathode where it is taken up just as in a cell with a metallic lithium anode. During recharge, the lithium is transferred back to the anode where it reintercalates into the carbon. Because no metallic lithium is present in the cell, melting of the anode does not occur even under abuse conditions. Also, because lithium is reincorporated into the anode by intercalation rather than by plating, dendritic and spongy lithium growth does not occur. Non-aqueous lithium electrochemical cells are discussed in U.S. Pat. Nos. 4,472,487, 4,668,595 and 5,028,500.

The use of carbon anodes however is not without problems. As $Li_xC$ is a reactive material which is difficult to handle in air, it is preferably produced in-situ in a cell. In doing so, some of the lithium is consumed in an irreversible process. This irreversible process results in an initial capacity loss for the cell which reduces the cell's overall performance. Furthermore, the cell often exhibits a progressive loss of capacity over numerous charge/discharge cycles. This progressive loss is commonly referred to as "capacity fade."

In view of the above shortcomings associated with the prior art, there is a need for non-aqueous electrochemical devices that are capable of providing improved performance, including better cycle life, specific electrode capacities, and energy density.

SUMMARY OF THE INVENTION

The present invention is based in part on the discovery that lithium ion electrochemical cells demonstrating expectedly superior performance can be fabricated by employing anodes comprising graphite of extra high crystallinity and purity.

In one aspect, the invention is directed to an electrochemical cell comprising:

an anode comprising a composition having graphite particles that have a BET method specific surface area of about 6 to about 12 $m^2/g$ and a crystallite height $L_c$ of about 100 nm to about 120 nm, or higher, and wherein at least 90% (wt) of the graphite particles are less than 16 $\mu$m in size;

a cathode; and a non-aqueous electrolyte containing a solvent and salt that is interposed between the anode and cathode.

In another aspect, the invention is directed to a method of fabricating an electrochemical cell comprising the steps of:

(a) providing an anode comprising a composition having graphite particles that have a BET method specific surface area of about 6 to about 12 $m^2/g$ and a crystallite height $L_c$ of about 100 nm to about 120 nm, or higher, and wherein at least 90% (wt) of the graphite particles are less than 16 $\mu$m in size (b) providing a cathode; and (c) forming a non-aqueous electrolyte containing a solvent-containing and salt that is interposed between said anode and said cathode.

Among the important features of the invention are that: (1) the anode has a specific electrode capacity of greater than 300 mAhr/g, (2) the electrochemical cell has a cycle life of greater than 1500 cycles, and (3) the electrochemical cell has a first cycle capacity loss of only about 10% to about 15%, where the first cycle capacity loss (%)=

$$\frac{(\text{first cycle charge capacity} - \text{first cycle discharge capacity}) \times 100\%}{\text{first cycle charge capacity}}$$

DETAILED DESCRIPTION OF THE PREFERRED EMBODIMENTS OF THE INVENTION

Figure 1:
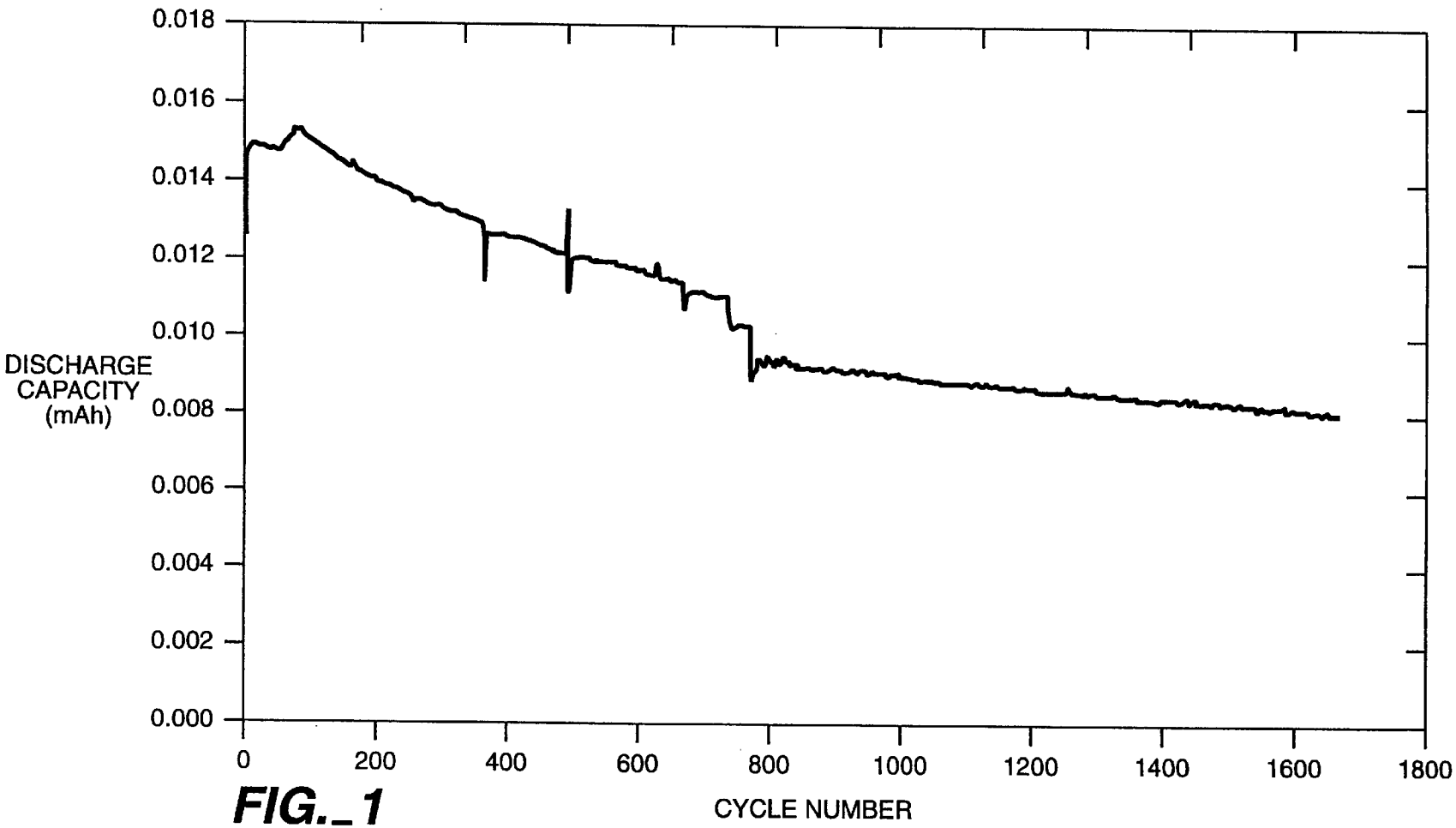
FIGS. 1, 2, 3, 4 and 5 graphically illustrate the discharge capacity vs. cycle number for electrochemical cells of the present invention.
Figure 2:
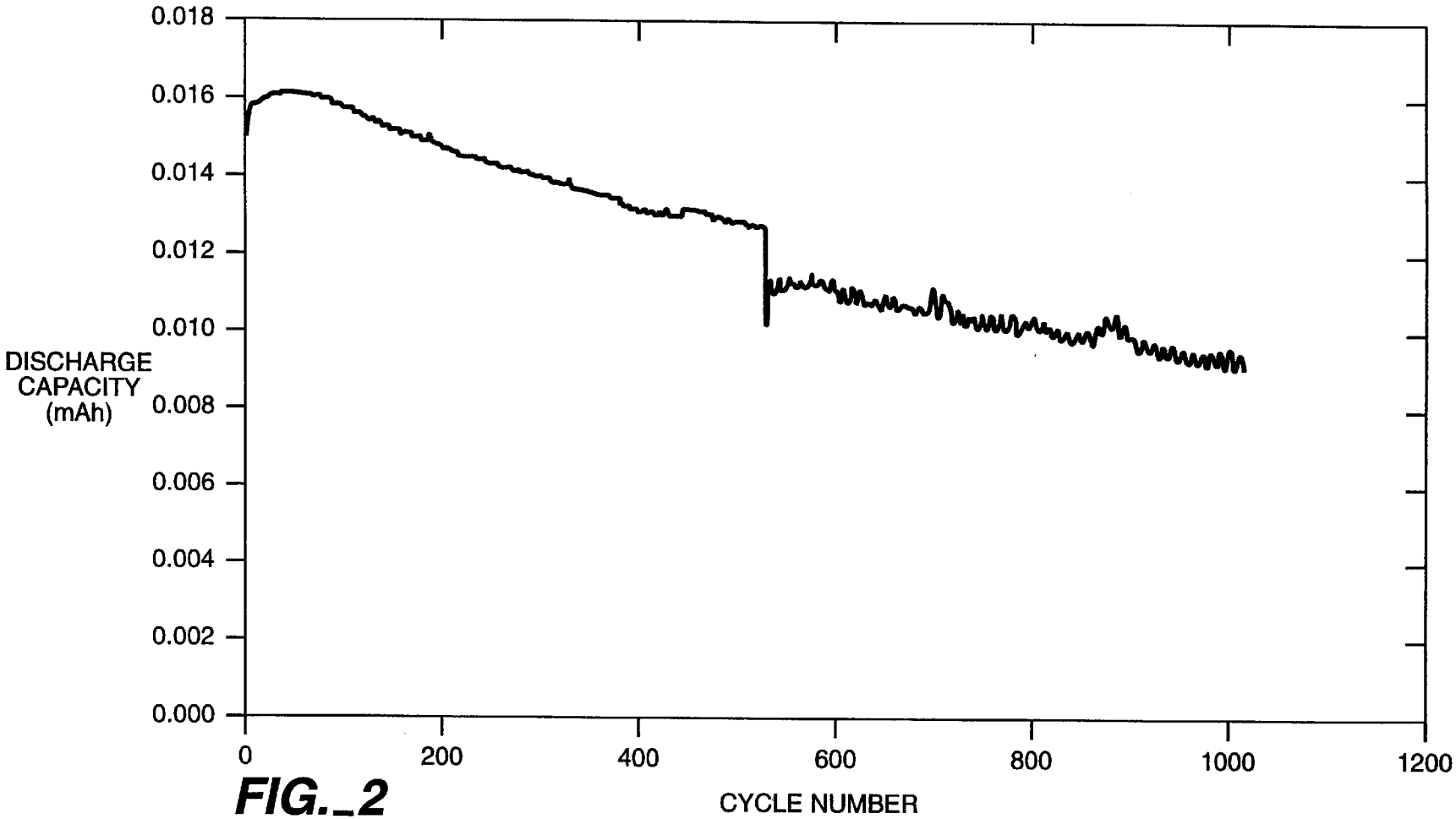
Figure 3:
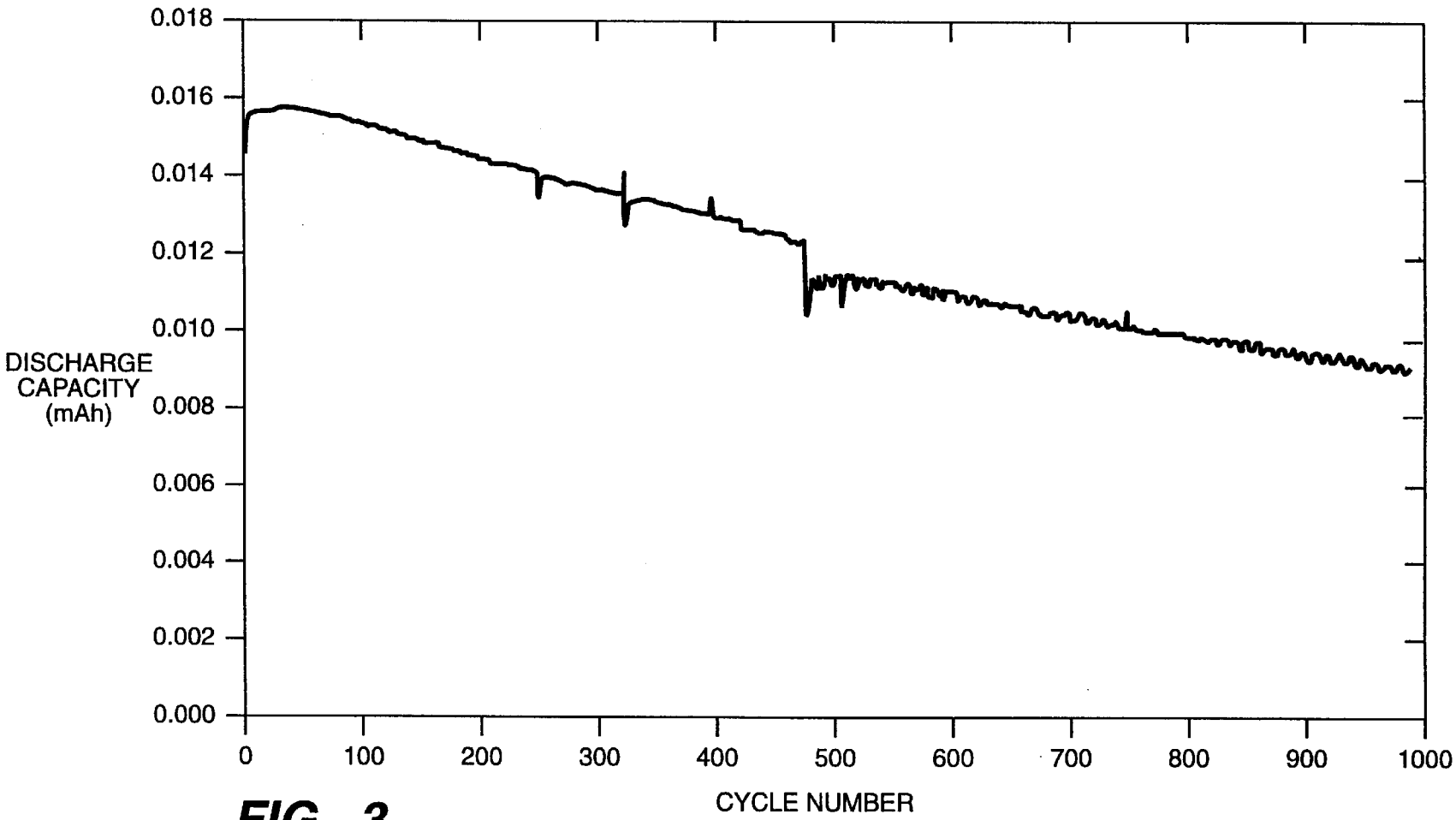
Figure 4:
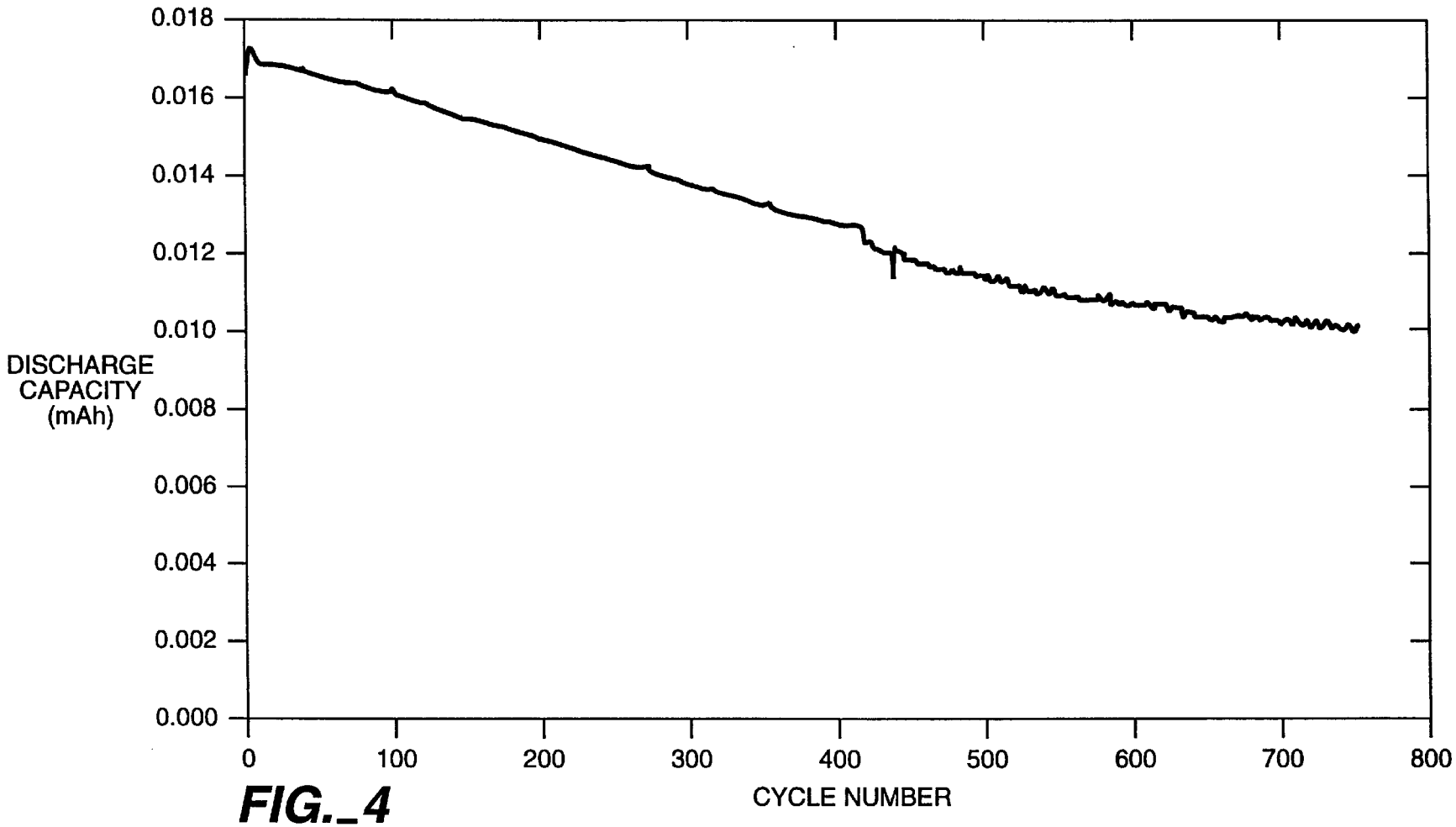
Figure 5:
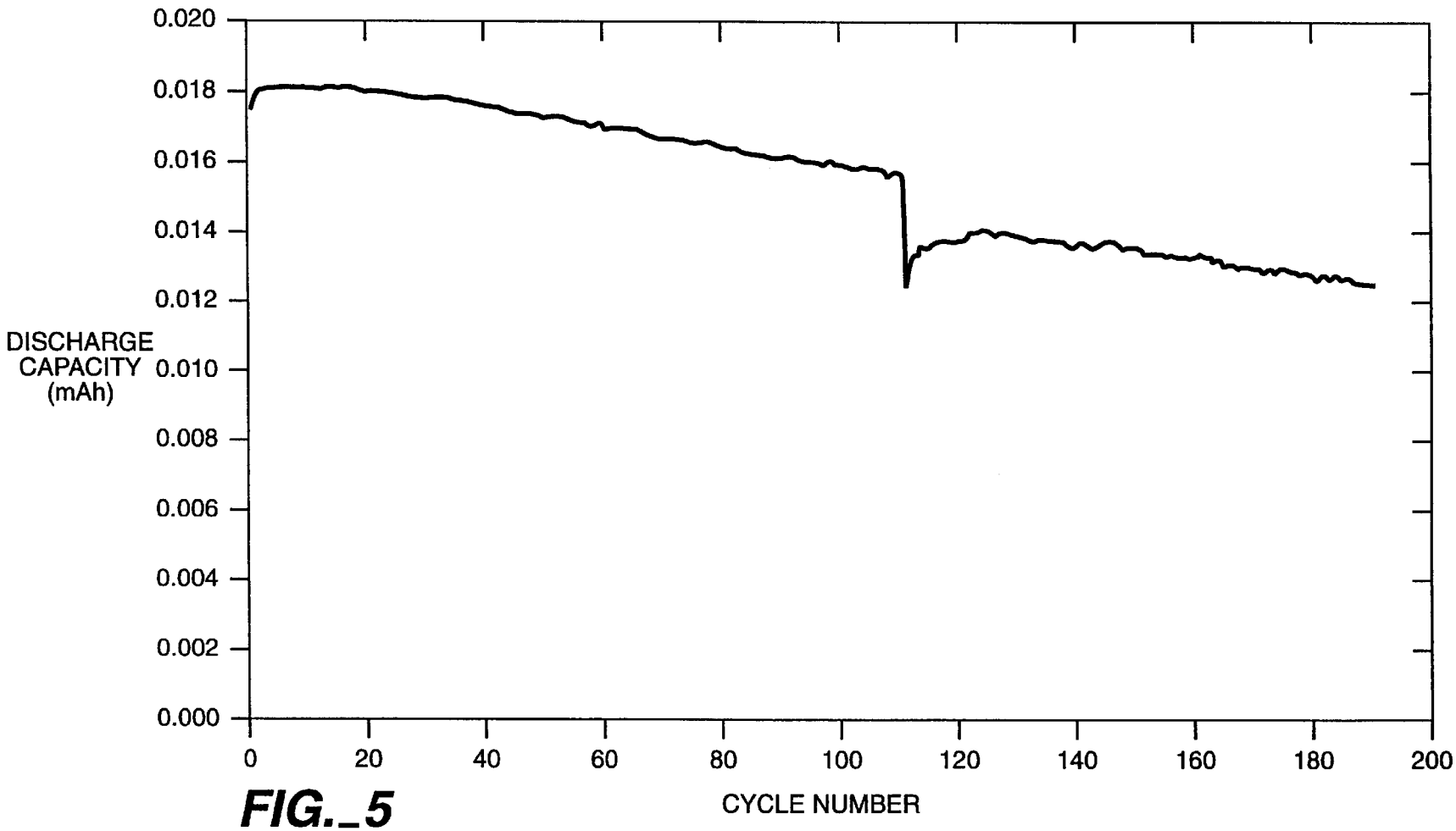

The present invention is directed to a rechargeable electrochemical device, particularly an electrochemical cell and battery, that includes: a cathode, an intercalation based carbon anode, with each electrode capable of reversibly incorporating (i.e., intercalating) an alkali metal, and a non-aqueous electrolyte comprising mi organic solvent and a salt of the alkali metal. Particularly preferred electrochemical cells and batteries use lithium metal and salts thereof. Preferred electrochemical cells and batteries comprise liquid non-aqueous electrolytes and solid non-aqueous electrolytes.

An aspect of the invention is that the intercalation based carbon anode comprises a graphite composition having a graphite particle size distribution wherein essentially all of the graphite particles are less than 48 $\mu$m in size, and preferably wherein at least 90% (wt) of the particles are less than 16 $\mu$m, and more preferably wherein at least about 94% of the particles are of less than 16 $\mu$m in size, and wherein $d_{50}$ is about 8.1 $\mu$m. $d_{50}$ is defined as the median size of the graphite particles.

Further, the crystillinity of the graphite is such that the crystallite height $L_c$ (i.e., coherence length) is at least 100 nm and preferably greater than 120 nm and the interlayer distance (c/2) is about 0.3354 nm to 0.3358 nm and more preferably about 0.3355 nm. The density of the graphite particles is preferably about 2.25 to about 2.265, more preferably about 2.26 g/cm$^3$. The specific surface area of the graphite, as determined by the Brunauer-Emmett-Teller or "BET" method, is preferably about 6 to about 12, and more preferably is about 8.8 m$^2$/g. The graphite contains less than about 0.15% (wt) ash, more preferably less than about 0.1%. Most preferably the graphite is anisotropic, which means that its fundamental physical properties (e.g., electronic resistivity) varies with direction. Graphite having the above physical characteristics and suitable for use in the graphite composition is available as a synthetic graphite under the tradename SFG-15™ from Lonza G & T, Ltd. (Sins, Switzerland). This particular graphite has high anistropy similar to natural graphite so that it has good compressibility and high electrical conductivity.

However, prior to describing this invention in further detail, the following terms will be defined.

The term "solid polymeric matrix" refers to an electrolyte compatible material formed by polymerizing an inorganic or organic monomer (or partial polymer thereof) and which, when used in combination with the other components of the electrolyte, renders the electrolyte solid. Suitable solid polymeric matrices are well known in the art and include solid matrices formed from inorganic polymers, organic polymers or a mixture of organic polymers with inorganic non-polymeric materials. Preferably, the solid polymeric matrix is an organic matrix derived from a solid matrix forming monomer and from partial polymers of a solid matrix forming monomer. See, for example, U.S. Pat. No. 4,925,751, which is incorporated herein.

Alternatively, the solid polymeric matrix can be used in combination with a non-polymeric inorganic matrix. See, for example, U.S. Pat. No. 4,990,413, which is incorporated herein by reference in its entirety. Suitable non-polymeric inorganic materials for use in conjunction with the solid polymeric matrix include, by way of example, β-alumina, silver oxide, lithium iodide, and the like. Suitable inorganic monomers are also disclosed in U.S. Pat. Nos. 4,247,499, 4,388,385, 4,414,607, 4,394,280, 4,432,891, 4,539,276, and 4,557,985 each of which is incorporated herein by reference.

The term "a solid matrix forming monomer" refers to inorganic or organic materials which in monomeric form can be polymerized, preferably in the presence of an inorganic ion salt, and a solvent mixture of an organic carbonate and a glyme compound, to form solid matrices which are suitable for use as solid electrolytes in electrolytic cells. Suitable solid matrix forming monomers are well known in the art and the particular monomer employed is not critical. Preferably, the solid matrix forming monomers have at least one heteroatom capable of forming donor acceptor bonds with inorganic cations (e.g., alkali ions). When polymerized, such compounds form an ionically conductive matrix.

Examples of suitable organic solid matrix forming monomers include, by way of example, propylene oxide, ethyleneimine, ethylene oxide, epichlorohydrin, acryloyl-derivatized polyalkylene oxides (as disclosed in U.S. Pat. No. 4,908,283), urethane acrylate, vinyl sulfonate polyalkylene oxides (as disclosed in U.S. Pat. No. 5,262,253, which patent is incorporated herein by reference in its entirety), and the like as well as mixtures thereof. Examples of suitable inorganic solid matrix forming monomers include, by way of example, phosphazenes and siloxanes. Phosphazene monomers and the resulting polyphosphazene solid matrix are disclosed by Abraham et al., Proc. Int. Power Sources Syrup., 34th, pp. 81–83 (1990) and by Abraham et al., J. Electrochemical Society, Vol. 138, No. 4, pp. 921–927 (1991).

The term "a partial polymer of a solid matrix forming monomer" refers to solid matrix forming monomers which have been partially polymerized to form reactive oligomers. Partial polymerization may be conducted for the purpose of enhancing the viscosity of the monomer, decreasing the volatility of the monomer, and the like. Partial polymerization is generally permitted so long as the resulting partial polymer can be further polymerized, preferably in the presence of a solvent, such as, a mixture of organic carbonate(s) to form solid polymeric matrices which are suitable for use as solid electrolytes in electrolytic cells.

The term "cured" or "cured product" refers to the treatment of the solid matrix forming monomer or partial polymer thereof under polymerization conditions (including cross-linking) so as to form a solid polymeric matrix. Suitable polymerization conditions are well known in the art and include by way of example, heating the monomer, irradiating the monomer with UV light, electron beams, and the like. The resulting cured product preferably contains repeating units containing at least one heteroatom such as oxygen or nitrogen which is capable of forming donor acceptor bonds with inorganic cations (alkali ions). Examples of suitable cured products suitable for use in this invention are set forth in U.S. Pat. Nos. 4,830,939 and 4,990,413 which are incorporated herein by reference in their entirety.

The solid matrix forming monomer or partial polymer can be cured or further cured prior to or after addition of the salt, solvent and, optionally, a viscosifier. For example, a composition comprising requisite amounts of the monomer or partial polymer, salt, organic carbonate solvent and viscosifier can be applied to a substrate and then cured. Alternatively, the monomer or partial polymer can be first cured and then dissolved in a suitable volatile solvent. Requisite amounts of the salt, organic carbonate solvent and viscosifier can then be added. The mixture is then placed on a substrate and cured; removal of the volatile solvent would result in the formation of a solid electrolyte. In either case, the resulting solid electrolyte would be a homogeneous, single phase product which is maintained upon curing, and does not readily separate upon cooling to temperatures below room temperature. Accordingly, the solid electrolyte of this invention does not include a separator as is typical of liquid electrolytes.

The term "salt" refers to any salt, for example, an inorganic salt, which is suitable for use in a non-aqueous electrolyte. Representative examples of suitable inorganic ion salts are alkali metal salts of less mobile anions of weak bases having a large anionic radius. Examples of such anions are $I^-$, $Br^-$, $SCN^-$, $ClO_4^-$, $BF_4^-$, $PF_6^-$, $AsF_6^-$, $CF_3COO^-$, $CF_3SO_3^-$, $N(SO_2CF_3)_2^-$, and the like. Specific examples of suitable inorganic ion salts include $LiClO_4$, LiSCN, $LiBF_4$, $LiAsF_6$, $LiCF_3SO_3$, $LiPF_6$, $(CF_3SO_2)_2NLi$, $(CF_3SO_2)_3CLi$, NaSCN, and the like. The inorganic ion salt preferably contains at least one cation selected from the group consisting of Li, Na, Cs, Rb, Ag, Cu, Mg and K.

The term "compatible electrolyte solvent" or "electrolytic solvent," or in the context of components of the non-aqueous electrolyte, just "solvent," is a low molecular weight organic solvent added to the electrolyte and/or the cathode composition, which may also serve the purpose of solvating the inorganic ion salt. The solvent is any compatible, relatively non-volatile, aprotic, relatively polar, solvent. Preferably, these materials have boiling points greater than about 85° C. to simplify manufacture and increase the shelf life of the electrolyte/battery. Typical examples of solvent are mixtures of such materials as dimethyl carbonate, diethyl carbonate, propylene carbonate, ethylene carbonate, gamma-butyrolactone, triglyme, tetraglyme, dimethylsulfoxide, dioxolane, sulfolane, and the like. When using propylene carbonate based electrolytes in an electrolytic cell with graphite anodes, a sequestering agent, such as a crown ether, is added in the electrolyte.

For electrochemical cells where (1) the cathode comprises lithiated cobalt oxides, lithiated manganese oxides, lithiated nickel oxides, $Li_xNi_{1-y}Co_yO_2$, where x is preferably about 1 and y is preferably 0.1–0.9, $LiNiVO_4$, or $LiCoVO_4$, and (2) the anode comprises carbon, the electrolytic solvent preferably comprises a mixture of ethylene carbonate and dimethyl carbonate. For electrochemical cells where the cathode comprises vanadium oxides, e.g., $V_6O_3$ and the anode is lithium, the electrolytic solvent preferably comprises a mixture of propylene carbonate and triglyme.

The term "organic carbonate" refers to hydrocarbyl carbonate compounds of no more than about 12 carbon atoms and which do not contain any hydroxyl groups. Preferably, the organic carbonate is a linear aliphatic carbonate and most preferably a cyclic aliphatic carbonate.

Suitable cyclic aliphatic carbonates for use in this invention include 1,3-dioxolan-2-one (ethylene carbonate); 4-methyl-1,3-dioxolan-2-one (propylene carbonate); 4,5-dimethyl-1,3-dioxolan-2-one; 4-ethyl-1,3-oxolan-2-one; 4,4-dimethyl-1,3-dioxolan-2-one; 4-methyl-5-ethyl-1,3-dioxolan-2-one; 4,5-diethyl-1,3-dioxolan-2-one; 4,4-diethyl-1,3-dioxolan-2-one; 1,3-dioxan-2-one; 4,4-dimethyl-1,3-dioxan-2-one; 5,5-dimethyl-1-1,3-dioxan-2-one; 5-methyl-1,3-dioxan-2-one; 4-methyl-1,3-dioxan-2-one; 5,5-diethyl-1,3-dioxan-2-one; 4,6-ethyl-1,3-dioxan-2-one; 4,4,6-trimethyl-1,3-dioxan-2-one; and spiro (1,3-oxa-2-cyclohexanone-5',5',1',3'-oxa-2'-cyclohexanone).

Several of these cyclic aliphatic carbonates are commercially available such as propylene carbonate and ethylene carbonate. Alternatively, the cyclic aliphatic carbonates can be readily prepared by well known reactions. For example, reaction of phosgene with a suitable alkane-α,β-diol (dihydroxy alkanes having hydroxyl substituents on adjacent carbon atoms) or an alkane-α,γ-diol (dihydroxy alkanes having hydroxyl substituents on carbon atoms in a 1,3 relationship) yields an a cyclic aliphatic carbonate for use within the scope of this invention. See, for instance, U.S. Pat. No. 4,115,206, which is incorporated herein by reference in its entirety.

Likewise, the cyclic aliphatic carbonates useful for this invention may be prepared by transesterification of a suitable alkane-α,β-diol or an alkane-α,γ-diol with, e.g., diethyl carbonate under transesterification conditions. See, for instance, U.S. Pat. Nos. 4,384,115 and 4,423,205 which are incorporated herein by reference in their entirety. Additional suitable cyclic aliphatic carbonates are disclosed in U.S. Pat. No. 4,747,850 which is also incorporated herein by reference in its entirety.

The term "viscosifier" refers to a suitable viscosifier for solid electrolytes. Viscosifiers include conventional viscosifiers such as those known to one of ordinary skill in the art. Suitable viscosifiers include film forming agents well known in the art which include, by way of example, polyethylene oxide, polypropylene oxide, copolymers thereof, and the like, having a number average molecular weight of at least about 100,000, polyvinylpyrrolidone, carboxymethylcellulose, and the like. Preferably, the viscosifier is employed in an amount of about 1 to about 10 weight percent and more preferably at about 2.5 weight percent based on the total weight of the electrolyte composition.

The term "electrolytic cell" or "electrochemical cell" refers to a composite containing an anode, a cathode and an ion-conducting electrolyte interposed therebetween.

The term "battery" refers to two or more electrochemical cells electrically interconnected in an appropriate series/parallel arrangement to provide the required operating voltage and current levels.

The anode is typically comprised of a compatible anodic material which is any material which functions as an anode in a solid electrolytic cell. Such compatible anodic materials are well known in the art and include, by way of example, lithium, lithium alloys, such as alloys of lithium with aluminum, mercury, manganese, iron, zinc, intercalation based anodes such as those employing carbon, tungsten oxides, and the like. Particularly preferred anodes include lithium intercalation anodes employing carbon materials such as graphite, cokes, mesocarbons, and the like. Such carbon intercalation based anodes typically include a polymeric binder suitable for forming a bound porous composite having a molecular weight of from about 1,000 to 5,000,000. Examples of suitable polymeric binders include EPDM (ethylene propylene diene termonomer), PVDF (polyvinylidene difluoride), EAA (ethylene acrylic acid copolymer), EVA (ethylene vinyl acetate copolymer), EAA/EVA copolymers, and the like. The anode of the present invention employs a graphite composition described above and a polymeric binder.

The inventive intercalation based anode preferably comprises about 80% to about 95% (wt) of the graphite particles, and more preferably about 90% (wt).

The cathode is typically comprised of a compatible cathodic material (i.e., insertion compounds) which is any material which functions as a positive pole in a solid electrolytic cell. Such compatible cathodic materials are well known in the art and include, by way of example, transition metal oxides, sulfides, and selenides, including lithiated compounds thereof. Representative materials include cobalt oxides, manganese oxides, molybdenum oxides, vanadium oxides, sulfides of titanium, molybdenum and niobium, the various chromium oxides, copper oxides, lithiated cobalt oxides, e.g., $LiCoO_2$, lithiated manganese oxides, e.g., $LiMn_2O_4$, lithiated nickel oxides, e.g., $LiNiO_2$, $LiNiVO_4$, $LiCoVO_4$, and mixtures thereof.

Preferred methods of fabricating an electrochemical cell are described herein. In addition, methods for preparing electrochemical cells and batteries are described in the art, for example, in U.S. Pat. Nos. 5,300,373, 5,316,556, 5,346,385, 5,262,253, 4,472,487, 4,668,595 and 5,028,500 and U.S. patent application Ser. Nos. 07/918,509 filed Jul. 22, 1992; 08/049,212, filed Apr. 19, 1993; and 08/414,874, filed Mar. 31, 1995, which are all incorporated herein in their entirety.

In one preferred embodiment, the cathode is prepared from a cathode paste which comprises from about 35 to 65 weight percent of a compatible cathodic material; from about 1 to 20 weight percent of an electroconductive agent; from about 0 to 20 weight percent of polyethylene oxide having a number average molecular weight of at least 100,000. When the cathode includes $V_6O_{13}$, the cathode paste preferably further comprises from about 10 to 50 weight percent of solvent comprising a 10:1 to 1:4 (w/w) mixture of an organic carbonate and a glyme. The paste further comprises from about 5 weight percent to about 25 weight percent of a solid matrix forming monomer or partial polymer. Also included is an ion conducting amount of an inorganic ion salt. Generally, the amount of the salt is from about 1 to about 25 weight percent. (All weight percents are based on the total weight of the cathode.)

In one preferred embodiment, the compatible cathodic material is mixed with an electroconductive material including, by way of example, graphite, powdered carbon, powdered nickel, metal particles, conductive polymers (i.e., characterized by a conjugated network of double bonds like polypyrrole and polyacetylene), and the like, and a polymeric binder to form under pressure a positive cathodic plate. Suitable binders for use in the cathode have a molecular weight of from about 1,000 to 5,000,000. Examples of suitable polymeric binders include EPDM (ethylene propylene diene termonomer), PVDF (polyvinylidene difluoride), EAA (ethylene acrylic acid copolymer), EVA (ethylene vinyl acetate copolymer), EAA/EVA copolymers, and the like.

The electrolyte composition typically comprises from about 5 to about 25 weight percent of the inorganic ion salt based on the total weight of the electrolyte; preferably, from about 10 to 20 weight percent; and even more preferably from about 10 to about 15 weight percent. The percentage of salt depends on the type of salt and electrolytic solvent employed.

For liquid electrolytes, the electrolyte composition typically comprises from about 80 to about 99 weight percent and preferably from about 85 to about 95 weight percent electrolyte solvent based on the total weight of the electrolyte. For solid electrolytes, the electrolyte composition typically comprises from about 40 to about 80 weight percent electrolyte solvent based on the total weight of the electrolyte; preferably from about 60 to about 80 weight percent; and even more preferably about 72 weight percent. For solid electrolytes, the electrolyte composition typically comprises from about 5 to about 30 weight percent of the solid polymeric matrix based on the total weight of the electrolyte and preferably comprises from about 10 to about 20 weight percent.

Experimental

Comparison of Anode Materials

Performance tests were conducted using lithium metal/carbon half-cells to compare the inventive graphite composition (available as SFG-15) to other graphite materials as potential anode materials. Each half-cell includes a lithium metal anode with an active material size of approximately 5 cm×7 cm×50 $\mu$m that has a polymeric mask around its perimeter so that about 12 $cm^2$ of anode surface faces the cathode. The cathode comprises the graphite material with 10 binder % (wt). Glass fiber (about 100 $\mu$m thick) was placed between the anode and cathode as a separator. The liquid electrolyte comprises an organic solvent mixture of 66% (wt) ethylene carbonate and 34% dimethyl carbonate. The inorganic salt used was $LiPF_6$ (1M solution). The specific capacity of the anode material at constant current cycling (at ±0.2 $mA/cm^2$) and the first cycle capacity loss (%) were measured for each half cell. The voltage limits were 2.0 and 0.01 volts. For half-cells, the first cycle capacity loss (%)=

$$\frac{(\text{first intercalation capacity} - \text{first deintercalation capacity}) \times 100\%}{\text{first intercalation capacity}}$$

The results of the tests are set forth in Table I. The graphite materials are identified by their tradenames and are available from Lonza G & T Ltd.

TABLE I

| Graphite Material of Half Cell | Specific Capacity [mAhr/g] | 1st Cycle Loss of Cell [%] |
|---|---|---|
| 1. SFG-15 | 351 ± 12 | 11 ± 1 |
| 2. KS-44 | 326 ± 15 | 46 ± 1 |
| 3. KS-15 | 325 ± 10 | 14 ± 1 |
| 4. KS-6 | 332 ± 19 | 29 ± 4 |
| 5. SFG-44 | 320 ± 2 | 30 ± 2 |
| 6. T-44 | 292 ± 18 | 40 ± 1 |

Table II sets forth relevant physical characteristics for each of the graphites.

TABLE II

| Graphite Material of Half Cell | Surface Area ($m^2/g$) (BET) | $L_c$ (nm) | Density ($g/cm^3$) | Particle Size* ($\mu$m) | $d_{50}$ ($\mu$m) |
|---|---|---|---|---|---|
| 1. SFG-15 | 8.8 | >120 | 2.26 | 16 | 8.1 |
| 2. KS-44 | 10 | >100 | 2.255 | 48 | 16.1 |
| 3. KS-15 | 14 | 90 | 2.255 | 16 | 7.7 |
| 4. KS-6 | 22 | 65 | 2.255 | 6 | 3.3 |
| 5. SFG-44 | 4.2 | <200 | 2.26 | 48 | 22 |
| 6. T-44 | 9.8 | >100 | 2.23 | 48 | 16.7 |

*Maximum size for at least 90% of graphite particles.

As is apparent, the half-cell employing the SFG-15 demonstrated the lowest first cycle loss and its anode had the highest specific capacity. (The theoretical specific capacity for graphite is 372 mAhr/g.)

Performance of Electrochemical Cells

Electrochemical cells fabricated generally in accordance with the procedures of the Example I described hereinbelow were tested. Specifically, the anode comprised SFG-15 and the binder was polyvinylidenedifluoride (instead of EPDM); the cathode comprised $LiMnO_4$ with EPDM as the binder; and the electrolyte comprised a mixture of ethylene carbonate (EC) and dimethyl carbonate (DMC) (67:33 ratio by weight) and 1M $LiPF_6$. The EC:DMC ratio can vary between about 20:80 to about 80:20 with a significant decrease in performance. The anode, cathode, and solid electrolyte of the electrochemical cells each has a surface area of approximately 12 $cm^2$.

The discharge capacities and recharge ratios for five electrochemical cells were measured at different discharge and charge currents. For each test, the voltage limits were 2.5 volts and 4.1 volts. FIGS. 1, 2, 3, 4 and 5 depict the discharge capacity vs. cycle numbers for five electrochemical cells. For cell number 1 (FIG. 1), the discharge rate was 2C and the charge rate was C (abbreviated as 2C/C). For cells 2–5 (FIG. 2–5), the discharge and charge rates were: C; C/0.5C; C/3; C/8, respectively. (When only one rate is provided, the discharge rate and charge rates are the same.)

As is apparent, the discharge or charge currents, for the cells have been expressed as a multiple of the rated capacity in ampere-hours. This common method of expressing the current is referred to as the C rate and is expressed as:

$$I = M \times C_n$$

where I=current, A

C=numerical value of rated capacity of a cell or battery, Ah n=C rate at which cell or battery was rated M=multiple or fraction (of C)

C rate is further described in Handbook of Batteries, D. Linden, Editor, MacGraw Hill.

While testing the five electrochemical cells, for logistical reasons that were unrelated to the tests, it was necessary to interrupt the cycling. For instance, in cell number 1, this occurred after about 750 cycles. About 30 days later, the cycling was restarted. As shown in FIG. 1, there was a slight decrease in the discharge capacity caused by the interruption. Nevertheless, the experiments establish that electrochemical cells employing SFG-15 demonstrate superior performance. For each of the five cells, the recharge ratio (i.e., charge capacity/discharge capacity) approached unity after about 10–20 cycles.

It is expected that lithium electrochemical cells employing the inventive anode structure will have a first cycle capacity loss of less than about 25%, preferably between about 10 and about 20% and more preferably between about 10 to about 15%. Furthermore, the inventive anode should have a specific electrode capacity of greater than 300 mAhr/g, and more preferably 320 to about 350 mAhr/g. Finally, the inventive lithium electrochemical cells should have a cycle life at greater than 1000 cycles, and more preferably between about 1000 to about 2000 cycles. The recharge ratio of the electrochemical cell, after the first 10–20 cycles should become about 1.

Methodology

The following Examples illustrate methods of how electrolytic cells could be fabricated. Example I describes the procedures for fabricating a liquid electrolytic cell and Example II describes the procedures for fabricating a solid electrolytic cell.

Example I

A liquid electrolytic cell is prepared by first preparing a cathodic slurry which is spread onto a current collector and cured. Similarly, an anode composition is placed on a current collector and cured. Thereafter, the anode and cathode are laminated so that a liquid electrolyte is situated therebetween to provide for an liquid electrolytic cell. For liquid electrolytic cells a separator is preferably employed. It should be noted that the inventive anode does not require the incorporation of carbon black as a conductive aid. The specifics of this construction are as follows.

A. The Cathode Current Collector

The cathode current collector employed is a sheet of aluminum foil having a layer of adhesion promoter attached to the surface of the foil which will contact the cathode so as to form a composite having a sheet of aluminum foil, a cathode and a layer of adhesion promoter interposed therebetween. The aluminum foil is preferably an alloy that is identified by either the industry specifications 1235-H19 (99.35% min. Al), or 1145-H19 (99.45% min. Al), and which is available from All Foils, Inc., Brooklyn Heights, Ohio. (Alternatively, aluminum mesh can be used as the current collector.)

The adhesion promoter layer is prepared as a dispersed colloidal solution in one of two methods. The first preparation of this colloidal solution for this example is as follows:

8.44 parts by weight of carbon powder (Shawinigan Black™—available from Chevron Chemical Company, San Ramon, Calif.) 33.76 parts by weight of a 25 weight percent solution of polyacrylic acid (a reported average molecular weight of about 90,000, commercially available from Aldrich Chemical Company—contains about 84.4 grams polyacrylic acid and 253.2 grams water)

57.80 parts by weight of isopropanol

In a preferred embodiment of the first method, an additional amount of water, e.g., 2–3 weight percent water based on the total weight of the colloidal solution, is incorporated to enhance coatability. Also, about 1 weight percent methyl ethyl ketone is added to the composition to enhance wettability of the aluminum.

The carbon powder and isopropanol are combined with mixing in a conventional high shear colloid mill mixer (Ebenbach-type colloid mill) until the carbon is uniformly dispersed and the carbon particle size is smaller than 10 $\mu$m. At this point, the 25 weight percent solution of polyacrylic acid is added to the mixer and further mixed for approximately 15 minutes. The resulting mixture is pumped to the coating head and applied by a reverse Gravure roller onto a sheet of aluminum foil about 9 in. (22.86 cm) wide and about 0.0005 in. (0.00127 cm) to about 0.001 in. (0.00254 cm) thick. After application, the solvent is evaporated by placing the mixture/foil into a conventional oven. After evaporation, an electrically-conducting adhesion-promoter layer of about 4–6 $\mu$m in thickness is formed. The aluminum foil is then cut to about 8 in. (20.32 cm) wide by removing approximately ½ in. (1.27 cm) from the sides with a conventional slitter so as to remove any uneven edges; the foil can then be further cut to the desired size.

The second preparation of this colloidal solution comprises mixing 25 lbs (11.35 kg) of carbon powder (Shawinigan Black™) with 100 lbs (45.4 kg) of a 25 weight percent solution of polyacrylic acid (average molecular weight of about 240,000, commercially available from BF Goodrich, Cleveland, Ohio, as Good-Rite K702—contains about 25 lbs (11.35 kg) polyacrylic acid and 75 lbs (34.05 kg) water) and with 18.5 lbs (8.399 kg) of isopropanol. Stirring is done in a 30 gallon (113.55 liters) polyethylene drum with a gear-motor mixer (e.g., Lighting Labmaster Mixer, model XJ-43, available from Cole-Parmer instruments Co., Niles, Ill.) at 720 rpm with two 5 in. (12.7 cm) diameter A310-type propellers mounted on a single shaft. This wets down the carbon and eliminates any further dust problem. The resulting weight of the mixture is 143.5 lbs (65.149 kg) and contains some "lumps."

The mixture is then further mixed with an ink mill which consists of three steel rollers almost in contact with each other, turning at 275, 300, and 325 rpms respectively. This high shear operation allows particles that are sufficiently small to pass directly through the rollers. Those that do not pass through the rollers continue to mix in the ink mill until they are small enough to pass through these rollers. When the mixing is complete, the carbon powder is completely dispersed. A Hegman fineness of grind gauge (available from Paul N. Gardner Co., Pompano Beach, Fla.) indicates that the particles are 4–6 $\mu$m with the occasional 12.5 $\mu$m particles. The mixture can be stored for well over 1 month without the carbon settling out or reagglomerating.

When this composition is to be used to coat the current collector, an additional 55.5 lbs (25.197 kg) of isopropanol is mixed into the composition working with 5 gallon (18.925 1) batches in a plastic pail using an air powered shaft mixer (Dayton model 42231 available from Granger Supply Co., San Jose, Calif.) with a 4 in. (10.16 cm) diameter Jiffy-Mixer brand impeller (such as an impeller available as Catalog No. G-04541-20 from Cole Parmer Instrument Co., Niles, Ill.). Then, it is gear pumped through a 25 $\mu$m cloth filter (e.g., So-Clean Filter Systems, American Felt and Filter Company, Newburgh, N.Y.) and coated as described above.

B. The Cathode

The cathode is prepared from a cathodic slurry which, in turn, is prepared from a cathode powder as follows:

i. Cathode Powder

The cathode powder is prepared by combining 94.1±1.1 weight percent $LiMn_2O_4$ and 5.9±1.1 weight percent of carbon (Shawinigan Blacks™). About 100 grams of the resulting mixture is placed into a grinding machine (Attritor Model S-1 available from Union Process, Akron, Ohio) and ground for 30 minutes at 150 rpm. Afterwards, the resulting mixture is passed through a 200 mesh screen and then vacuum dried at 60° C. to produce a cathode powder with a water content of less than about 1000 ppm and preferably less than about 300 ppm.

ii. Cathode Slurry

A cathode slurry is prepared by combining sufficient cathode powder to provide for a final product having about 51.7 weight percent $LiMn_2O_4$. The slurry contains the following (in approximate weight percent):

| | |
|---|---|
| $LiMn_2O_4$ | 51.744% |
| Carbon | 6.456% |
| EPDM (ethylene propylene diene monomer) | 1.8% |
| Xylene | 40.0% |
| | 100% |

The method of preparing 100 grams of the cathode slurry is as follows:

1.8 grams of EPDM (Mooney viscosity of 26±5 and available as VISTALON™2504 (Exxon Chemicals Co., Houston, Tex.) are mixed with 16.2 grams of xylene to form a 10.0% (wt.) EPDM solution. The temperature is maintained at between 40°–45° C. as the EPDM is added to the xylene. The solution is preferably filtered through a 20 micron filter cartridge.

An amount of carbon powder sufficient to provide 51.744 grams of $LiMn_2O_4$ per 100 grams of cathode slurry and a sufficient amount of carbon (Shawinigan Black™) to provide 6.456 grams of total carbon per 100 grams of slurry are mixed in a double planetary mixer where the blend is stirred at 7.5 Hz and 25° C. The above EPDM-xylene solution is passed through 4A molecular sieves and then added to the $LiMn_2O_4$ and carbon blend under vacuum mixing over a 5 minute period during which time an additional 23.8 grams of xylene are added. Afterwards, the mixing speed is increased from 7.5 to 20 Hz and maintained for another 5 minutes. Thereafter, the temperature of the mixture is gradually raised to 85° C. over about a 45 minute period and maintained at the elevated temperature for about 30 minutes. Next, the mixing speed is decreased to about 1 Hz and subsequently the temperature of the mixture is allowed to decrease gradually to about 45° C. over about a 30 minute period. Finally, the mixture is mixed for 5 minutes at this temperature.

The extruded cathode slurry is then coated to a substantially uniform thickness of about 25–200 μm, more preferably 50–100 μm, and most preferably about 100 μm, over the current collector by a doctor blade, Meyer-rod, or by reverse roll coating. The cathode slurry/current collector is heated to remove the xylene.

C. Electrolyte

The electrolyte comprise a solvent mixture of ethylene carbonate dimethyl carbonate (66:34 wt ratio) and 1.0M $LiPF_6$.

D. The Anode Current Collector

The anode current collector employed is a sheet of copper foil, about 0.33 mils (8.5 μm) to 0.5 mils (12.7 μm) thick, having a layer of adhesion promoter attached to the surface of the foil which will contact the anode so as to form a composite having a sheet of copper foil, an anode and a layer of adhesion promoter interposed therebetween. (Alternatively, copper mesh can be used as the current collector.)

The same adhesion promoter composition used with the cathode is employed with the anode.

E. The Anode

The anode is prepared from a graphite slurry as follows:

A polyvinylidenedifluoride (PVDF) solution was prepared by mixing 300 grams of 120,000 MW PVDF (PolyScience) in 300 ml of dimethyl formamide. The mixture was stirred for 2–3 hours with a magnetic stirrer to dissolve all of the PVDF. The PVDF functions as a binder for the graphite in the anode.

Next, a PVDF/graphite slurry was prepared by first adding 36 grams of graphite (SFG-15) into about 38.5 grams of the PVDF solution. The mixture was homogenized with a commercial homogenizer or blender. (For example, Tissue Homogenizer System from Cole-Parmer Instrument Co., Niles, Ill.). The viscosity of the slurry was adjusted to about 200 cp with additional PVDF solution.

The slurry was coated onto a bare copper foil by standard solvent casting techniques, such as by a doctor blade type coating. (Alternatively, the slurry can be coated onto a copper foil having a polymeric adhesion promoter layer, described above.) In preparing the slurry, it is not necessary to grind or dry the graphite, nor is it necessary to add conductive carbon black to the graphite anode formulation.

Finally, the electrodes are dried at approximately 150° C. for 10 hours to remove residual water prior to making the electrochemical cells.

F. The Solid Electrolytic Cell

A sheet comprising a liquid electrochemical cell is prepared by laminating the anode composite with the cathode composite so that the liquid electrolyte is positioned between the anode and cathode. Lamination is accomplished by minimal pressure.

Example II

A solid electrolytic cell is prepared by first preparing a cathodic slurry which is spread onto a current collector. An electrolyte solution is then placed onto the cathode surface and the cathode slurry and electrolyte solution are simultaneously cured to provide for a solid electrolyte composition. Similarly, an anode composition is placed on a current collector and cured. Thereafter, the anode and cathode are laminated so that the solid electrolyte composition is situated therebetween to provide for a solid electrolytic cell.

In constructing a solid electrolytic cell, the cathode current collector, cathode, anode current collector and anode, are fabricated in the manner as described above in Example I and the solid electrolyte is fabricated as described herein.

Electrolyte 36.26 grams of propylene carbonate, 3.45 grams of trimethyl propyl triacrylate, 36.26 grams of ethylene carbonate, and 13.79 grams of urethane acrylate are combined at room temperature until homogeneous. The resulting solution is optionally passed through a column of 4 Å molecular sieves to remove water and then the recovered solution is mixed at room temperature until homogeneous. If necessary, the ethylene carbonate can first be dissolved in propylene carbonate with heat.

At this point, 1.47 grams of polyethylene oxide film forming agent having a number average molecular weight of about 600,000 (available as Polyox WSR-205 from Union Carbide Chemicals and Plastics, Danbury, Conn.) is added to the above solution and then dispersed while stirring with a magnetic stirrer over a period of about 60–120 minutes. After dispersion, the solution is heated to between 60° and 65° C. with stirring until the film forming agent is dissolved. A thermocouple is placed at the edge of the vortex created by the magnetic stirrer to monitor solution temperature. The solution is cooled to a temperature of less than 48° C. and then 8.77 grams of $LiPF_6$ are added to the solution over a 120 minute period while thoroughly mixing to ensure a substantially uniform temperature profile throughout the solution. Cooling is applied as necessary to maintain the temperature of the solution at less than 48° C.

In one optional embodiment, the polyethylene oxide film forming agent is added to the solution via a mini-sieve, such as a 25 mesh mini-sieve that is commercially available as Order No. 57333-965 from VWR Scientific, San Francisco, Calif.

The resulting solution contains the following, in approximate weight percent based on the total weight of the electrolyte solution (100 g):

| | |
|---|---|
| Propylene Carbonate | 36.26 |
| Ethylene Carbonate | 36.26 |
| Trimethyl Propyl Triacrylate | 3.45 |
| Urethane Acrylate | 13.79 |
| $LiPF_6$ | 8.77 |
| PEO Film Forming Agent | 1.47 |
| Total | 100 grams |

This solution is then degassed to provide for an electrolyte solution wherein little, if any, of the $LiPF_6$ salt decomposes.

Optionally, the above solution which contains the polymer, the film forming agent, the electrolytic solvents and the $LiPF_6$ salt, is filtered to remove any solid particles or gels remaining in the solution. One suitable filter device is a sintered stainless steel screen having a pore size between 1 and 50 μm at 100% efficiency.

In an alternative embodiment, the electrolyte is prepared by the following steps using the same above described electrolyte components:

1. Check the moisture level of the urethane acrylate. If the moisture level is less than 100 ppm water, proceed to step 2. If not, then first dissolve the urethane acrylate at room temperature, <30° C., in the propylene carbonate and ethylene carbonate and dry the solution over 4 Å molecular sieves (Grade 514, 8–12 Mesh from Schoofs Inc., Moraga, Calif.) and then proceed to step 4.
2. Dry the propylene carbonate and ethylene carbonate over 4 Å molecular sieves (Grade 514, 8–12 Mesh from Schoofs Inc., Moraga, Calif.).
3. At room temperature, <30° C., add the urethane acrylate to the solvent prepared in step 2. Stir until the resin is completely dissolved. The solution should be clear and colorless.
4. Dry and optionally sift the polyethylene oxide film forming agent through a 25 mesh mini-sieve commercially available as Order No. 57333-965 from VWR Scientific, San Francisco, Calif. While stirring add the dried and pre-sifted polyethylene oxide film forming agent slowly to the solution. The polyethylene oxide film forming agent should be sifted into the center of the vortex formed by the stirring means at a controlled rate to avoid agglomerate formation. Addition of the polyethylene oxide film forming agent should be dispersive and, during addition, the temperature should be maintained at room temperature (<30° C.).
5. After final addition of the polyethylene oxide film forming agent, stir to ensure that the film forming agent is substantially dispersed.
6. Heat the mixture to 68° to 75° C. and stir until the film forming agent has melted and the solution has become transparent. Optionally, in this step, the mixture is heated to 65° to 68° C.
7. Cool the solution produced in step 6 and when the temperature of the solution reaches 40° C., add the $LiPF_6$ salt very slowly making sure that the maximum temperature does not exceed 55° C. and preferably does not exceed about 40° C.
8. Following the addition of the $LiPF_6$ salt, the solution is stirred and degassed. The electrolyte solution is allowed to cool before usage.
9. Optionally, filter the solution through a sintered stainless steel screen having a pore size between 1 and 50 μm at 100% efficiency.

At all times, the temperature of the solution should be monitored with a thermocouple which should be placed in the vortex formed by the mixer.

Afterwards, the electrolyte mixture is coated by a slot die coater or a reverse roll flexographic coater to a thickness of about 25–50 μm onto the surface of the dried cathode slurry.

The Solid Electrolytic Cell

A sheet comprising a solid battery is prepared by laminating the electrolyte/anode composite with the electrolyte/cathode composite so that the electrolyte is positioned between the anode and cathode. Lamination is accomplished by minimal pressure.

While the invention has been described in terms of various preferred embodiments, the skilled artisan will appreciate the various modifications, substitutions, and changes which may be made without departing from the spirit hereof. The descriptions of the subject matter in this disclosure are illustrative of the invention and are not intended to be construed as limitations upon the scope of the invention.

What is claimed is:

1. An electrochemical cell comprising:

an anode comprising a composition comprising a polymer binder and a lithium intercalation carbon material in the form of graphite particles that have a BET method specific surface area of about 6 to about 12 $m^2/g$, a crystallite height $L_c$ *of about 100 nm to about 120 nm, or higher, and a density of about 2.25 to about* 2.265 $g/cm^3$, wherein at least 90% (wt) of the graphite particles are less than 16 μm in size and wherein the [polymer binder comprises ] *graphite particles comprise from* about 80% (wt) *to about 95%* (*wt*) [or more] of said composition;

a cathode; and a non-aqueous electrolyte containing a solvent and salt that is interposed between the anode and cathode.

2. The electrochemical cell of claim 1 wherein the graphite particles have a median size of about 8.1 μm.

3. The electrochemical cell of claim 1 wherein the graphite particles are anisotropic, the particles have a surface area of about 8.8 $m^2/g$, and at least 94% (wt) of the graphite are less than 16 μm in size.

4. The electrochemical cell of claim 2 wherein the graphite particles are anisotropic, the particles have a surface area of about 8.8 $m^2/g$, and at least 94% (wt) of the graphite are less than 16 μm in size.

5. The electrochemical cell of claim 2 wherein the graphite particles are anisotropic, the particles have a surface area of about 8.8 $m^2/g$, and at least 94% (wt) of the graphite are less than 16 $\mu$m in size, and the graphite has a inter layer distance of about 0.3354 nm to about 0.3358 nm.

6. The electrochemical cell of claim 1 wherein the anode has a specific electrode capacity of greater than 350 mAhr/g.

7. The electrochemical cell of claim 1 wherein the cathode comprises material selected from the group consisting of vanadium oxide, lithiated cobalt oxide, lithiated manganese oxide, and mixtures thereof.

[8. The electrochemical cell of claim 1 wherein the composition of the anode comprises about 80% to about 95% (wt) of said graphite and the composition further comprises a polymeric binder.]

9. The electrochemical cell of claim 1 wherein the electrolyte further comprises a solid polymeric matrix.

10. A method of fabricating an electrochemical cell comprising the steps of:

(a) providing an anode comprising a composition comprising a polymeric binder and a lithium intercalation carbon material in the form of graphite particles that have a BET method specific surface area of about 6 to about 12 $m^2/g$, a crystallite height $L_c$ of about 100 nm to about 120 nm, or higher, and a density of about 2.25 to about 2.265 $m^2/g$ wherein at least 90% (wt) of the graphite particles are less than 16 $\mu$m in size and wherein the [polymer binder comprises] *graphite particles comprise from* about 80% (wt) *to about 95%* (*wt*) [or more] of said composition:

(b) providing a cathode; and (c) forming a non-aqueous electrolyte containing a solvent-containing and salt that is interposed between said anode and said cathode.

11. The method of claim 10 wherein the graphite particles have a median size of about 8.1 $\mu$m.

12. The method of claim 10 wherein the graphite particles are anisotropic, the particles have a surface area of about 8.8 $m^2/g$, and at least 94% (wt) of the graphite are less than 16 $\mu$m in size.

13. The method of claim 11 wherein the graphite particles are anisotropic, the particles have a surface area of about 8.8 $m^2/g$, and at least 94% (wt) of the graphite are less than 16 $\mu$m in size.

14. The method of claim 11 characterized wherein the graphite particles are anisotropic, the particles have a surface area of about 8.8 $m^2/g$, and at least 94% (wt) of the graphite are less than 16 $\mu$m in size, and the graphite has a inter layer distance of about 0.3354 nm to about 0.3358 nm.

15. The method of claim 10 wherein the anode has a specific electrode capacity of greater than 350 mAhr/g.

16. The method of claim 10 wherein the cathode comprises material selected from the group consisting of vanadium oxide, lithiated cobalt oxide, lithiated manganese oxide, and mixtures thereof.

[17. The method of claim 10 wherein the composition of the anode comprises about 80% to about 95% (wt) of said graphite and the composition further comprises a polymeric binders.]

18. The method of claim 10 wherein the electrolyte further comprises a solid polymeric matrix.

19. The electrochemical cell of claim 6 characterized in that the cell has a first cycle loss of about 11% or less.

20. The method of claim 19 characterized in that the cell has a first cycle loss of about 11% or less.

* * * * *